United States Patent
Park et al.

(10) Patent No.: US 8,630,266 B2
(45) Date of Patent: Jan. 14, 2014

(54) DATA STREAM TRANSMITTING AND RECEIVING METHOD AND APPARATUS FOR GUARANTEEING QOS

(75) Inventors: Soo-hong Park, Yongin-si (KR); Young-keun Kim, Incheon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 644 days.

(21) Appl. No.: 11/702,525

(22) Filed: Feb. 6, 2007

(65) Prior Publication Data

US 2007/0191012 A1  Aug. 16, 2007

Related U.S. Application Data

(60) Provisional application No. 60/772,902, filed on Feb. 14, 2006.

(30) Foreign Application Priority Data

Mar. 29, 2006 (KR) .................. 10-2006-0028422

(51) Int. Cl.
*H04W 4/00* (2009.01)
*H04W 36/00* (2009.01)

(52) U.S. Cl.
USPC ................ 370/332; 370/331; 455/436

(58) Field of Classification Search
USPC ............. 370/328, 446, 338, 349, 310.2, 32, 370/331–333, 351–356, 360, 465–467, 469, 370/395.5, 395.6, 395.61–395.65; 455/432.1–444, 525, 513, 515, 115.3, 455/414.4, 418–422.1, 449, 63.1, 63.2, 455/550.1, 552.1, 553.1, 556.1, 556.2, 560, 455/561

See application file for complete search history.

(56) References Cited

U.S. PATENT DOCUMENTS

| | | | |
|---|---|---|---|
| 7,263,067 B2 | 8/2007 | Sreemanthula et al. | |
| 7,512,087 B2 | 3/2009 | Yoshikawa et al. | |
| 7,561,553 B2* | 7/2009 | Venkitaraman et al. | 370/338 |
| 2002/0150228 A1 | 10/2002 | Umeda et al. | |
| 2003/0043773 A1* | 3/2003 | Chang | 370/338 |
| 2003/0069018 A1 | 4/2003 | Matta | |
| 2003/0078044 A1* | 4/2003 | Leung | 455/436 |

(Continued)

FOREIGN PATENT DOCUMENTS

| | | |
|---|---|---|
| CN | 1547821 A | 11/2004 |
| EP | 1 435 748 A1 | 7/2004 |

(Continued)

OTHER PUBLICATIONS

Search Report issued in International Application No. PCT/KR2007/000647 on May 8, 2007.

(Continued)

*Primary Examiner* — San Htun
(74) *Attorney, Agent, or Firm* — Staas & Halsey LLP

(57) ABSTRACT

A data stream transmitting and receiving method and apparatus guaranteeing quality of service (QoS), in which the data stream transmitting method includes obtaining information regarding a link characteristic change of a mobile node, which occurs due to a handover of the mobile node between heterogeneous links, and transmitting the data stream to the mobile node based on the obtained information. Accordingly, even when the handover of the mobile node between heterogeneous links is performed, QoS of the data stream can be guaranteed.

28 Claims, 8 Drawing Sheets

(56) References Cited

U.S. PATENT DOCUMENTS

| | | | |
|---|---|---|---|
| 2003/0139185 A1 | 7/2003 | Obata et al. | |
| 2003/0236827 A1* | 12/2003 | Patel et al. | 709/203 |
| 2004/0100924 A1* | 5/2004 | Yam | 370/338 |
| 2004/0174853 A1 | 9/2004 | Saito et al. | |
| 2004/0190468 A1* | 9/2004 | Saijonmaa | 370/312 |
| 2004/0228304 A1* | 11/2004 | Riedel et al. | 370/332 |
| 2005/0068965 A1* | 3/2005 | Lin et al. | 370/395.21 |
| 2005/0157646 A1 | 7/2005 | Addagatla et al. | |
| 2005/0221824 A1* | 10/2005 | Lee et al. | 455/435.2 |
| 2005/0249161 A1 | 11/2005 | Carlton | |
| 2006/0039335 A1* | 2/2006 | Ono et al. | 370/338 |
| 2006/0077994 A1 | 4/2006 | Spindola et al. | |
| 2006/0126509 A1 | 6/2006 | Abi-Nassif et al. | |
| 2006/0140150 A1* | 6/2006 | Olvera-Hernandez et al. | 370/331 |
| 2006/0153110 A1* | 7/2006 | Morgan et al. | 370/310 |
| 2006/0164974 A1 | 7/2006 | Ramalho et al. | |
| 2006/0183479 A1* | 8/2006 | Liu et al. | 455/436 |
| 2006/0221933 A1* | 10/2006 | Bauer et al. | 370/352 |
| 2006/0246904 A1* | 11/2006 | Olvera-Hernandez et al. | 455/438 |
| 2006/0262732 A1* | 11/2006 | Joutsenvirta et al. | 370/254 |
| 2006/0268784 A1 | 11/2006 | Lee et al. | |
| 2007/0191012 A1 | 8/2007 | Park et al. | |
| 2007/0291699 A1 | 12/2007 | Lee et al. | |

FOREIGN PATENT DOCUMENTS

| | | |
|---|---|---|
| JP | 2002-135823 | 5/2002 |
| JP | 2003-179630 | 6/2003 |
| JP | 2004-272563 | 9/2004 |
| JP | 2005-532735 | 10/2005 |
| JP | 2007-527177 | 9/2007 |
| JP | 2007-528176 | 10/2007 |
| KR | 2002-40611 | 5/2002 |
| KR | 2006-71299 | 6/2006 |
| WO | WO 99/66748 | 12/1999 |
| WO | 00/38465 | 6/2000 |
| WO | 02/15630 A1 | 2/2002 |
| WO | WO 03/021854 A1 | 3/2003 |
| WO | WO 03/096553 A2 | 11/2003 |
| WO | 2004/006448 A2 | 1/2004 |
| WO | WO 2005/006626 | 1/2005 |
| WO | WO 2005034431 A1 * | 4/2005 |
| WO | 2005/084146 | 9/2005 |
| WO | 2005/086422 A1 | 9/2005 |

OTHER PUBLICATIONS

Written Opinion issued in International Application No. PCT/KR2007/000647 on May 8, 2007.

Office Action issued on Jun. 12, 2007 by the Korean Intellectual Property Office for Korean Patent Application No. 2006-28422.

Eddie Kohler et al., "Datagram Congestion Control Protocol (DCCP)", IETF Standard-Working-Draft, Internet Engineering Task Force, IETF, SH, vol. dccp, No. 11, Mar. 10, 2005, pp. 1-128.

Y. Swami, et al., "Lightweight Mobility Detection and Response (LMDR) Algorithm for TCP", IEFT Standard-Working-Draft, Internet Engineering Task Force, IEFT, CH, No. 5, Feb. 11, 2005, pp. 1-18.

Eddie Kohler, "Datagram Congestion Control Protocol Mobility and Multihoming", IETF Standard-Working-Draft, Internet Engineering Task Force, IETF, CH., No. 1, Jan. 29, 2006, pp. 1-20.

Office Action issued in corresponding European Patent Application No. 07101441.9 dated Nov. 30, 2007.

U.S. Appl. No. 11/594,749, filed Nov. 9, 2006, Jeong-rok Jang, Samsung Electronics Co., Ltd.

Office Action dated Jan. 15, 2010 for related U.S. Appl. No. 11/594,749.

Office Action dated Jun. 12, 2009 for related U.S. Appl. No. 11/594,749.

European Search Report dated Feb. 6, 2012 in corresponding European Patent Application 07708797.1.

Korean Office Action issued Feb. 14, 2012 in corresponding Japanese Office Action 2008-5544128.

Japanese Office Action dated Jun. 12, 2012, from Japanese Patent Application 2008-554128.

Chinese Office Action dated Apr. 25, 2012, from Chinese Patent Application 200780005531.8.

Chinese Office Action for corresponding Chinese Patent Application No. 200780005531.8 dated Jun. 2, 2011.

Japanese Office Action for corresponding Japanese Patent Application No. 2008-554128 dated Oct. 11, 2011.

European Office Communication dated Jan. 8, 2013 from European Patent Application No. 07708797.1.

Japanese Office Action dated Feb. 12, 2013 from Japanese Patent Application No. 2008-554128.

Appeal Decision dated Aug. 13, 2013 for Japanese Patent Application No. 2008-554128.

* cited by examiner

| Name of Information Element | Description | Media Types | Comments |
|---|---|---|---|
| Neighbor Information | ... | ... | ... |
| Security Information | ... | ... | ... |
| QoS Information | QoS Parameters | All | BER, SNR, DataRate, Data Latency, DataJitter |
| ⋮ | ⋮ | ⋮ | ⋮ |

FIG. 4

| Event Identifier | Event Type | Event Name | Description |
|---|---|---|---|
| ... | ... | ... | ... |
| ... | ... | ... | ... |
| LCI | Link Characteristic Information | Link Characteristic Information | Providing the link characteristic information such as Data Rate (Kbps), Link Type, etc. to allow end nodes to quickly adjust its sending rate for ongoing connections according to the reported link characteristic information by MIES. |

FIG. 5

MIH_Information.request

| Name (501) | Type (502) | Length (503) | Value (504) |
|---|---|---|---|
| Link Characteristic Information | String | Variables | Data Rate (Kbps), etc. |
| LinkType | Bits | | 0: 802.3 (Ethernet)<br>1: 802.11b<br>2: 802.11a<br>3: 802.11g<br>4: 802.11n<br>5-10: Reserved for (W)LAN Extensions<br>11: CDMA<br>12: GPRS<br>13: UMTS<br>14-20: Reserved for Cellular Networks<br>21-25: 802.15 Family Networks<br>26-30: 802.16 Family Networks<br>31-: Reserved |

FIG. 6

MIH_Information.response

| Name | Type | Length | Value |
|---|---|---|---|
| Link Characteristic Information | String | Variables | Data Rate (Kbps), etc. |
| LinkType | Bits | | 0: 802.3 (Ethernet)<br>1: 802.11b<br>2: 802.11a<br>3: 802.11g<br>4: 802.11n<br>5-10: Reserved for (W)LAN Extensions<br>11: CDMA<br>12: GPRS<br>13: UMTS<br>14-20: Reserved for Cellular Networks<br>21-25: 802.15 Family Networks<br>26-30: 802.16 Family Networks<br>31-: Reserved |

601  602  603  604

DATA STREAM TRANSMITTING AND RECEIVING METHOD AND APPARATUS FOR GUARANTEEING QOS

CROSS-REFERENCE TO RELATED APPLICATIONS

This application claims the benefit of Korean Patent Application No. 2006-28422, filed on Mar. 29, 2006, in the Korean Intellectual Property Office, and the benefit of U.S. Provisional Patent Application No. 60/772,902, filed on Feb. 14, 2006, in the U.S. Patent and Trademark Office, the disclosures of which are incorporated herein by reference.

BACKGROUND OF THE INVENTION

1. Field of the Invention

An aspect of the present invention relates to a data stream transmitting and receiving method and apparatus for guaranteeing quality of service (QoS), and more particularly, to a data stream transmitting and receiving method and apparatus for guaranteeing QoS in a wireless communication environment based on the Institute of Electrical and Electronics Engineers (IEEE) 802.21 standard.

2. Description of the Related Art

In recent times, along with the development of communication technology, a variety of communication networks have been developed. Representative examples of such networks include a variety of links, such as IEEE 802.11, IEEE 802.15, and IEEE 802.16-based wireless local area network (WLAN) links and $3^{rd}$ Generation Partnership Project (3GPP) and 3GPP2-based cellular links. To cope with the variety of links, a mobile node in which heterogeneous link interfaces for connection with various links are installed has become available on the market, and the IEEE 802.21 standard for supporting handovers between different links was established.

However, according to the IEEE 802.21 standard, when a mobile node moves from a certain link to another heterogeneous link, there is a problem in that the QoS of a data stream received by the mobile node is not guaranteed due to the possibility of sudden changes in the communication environment. That is, in such a case, a bit error ratio (BER) and a signal-to-noise ratio (SNR) of a data stream received by a mobile node are increased.

SUMMARY OF THE INVENTION

An aspect of the present invention provides a method and apparatus for guaranteeing quality of service (QoS) of a data stream received by a mobile node even when the mobile node moves from a certain link to another heterogeneous link.

An aspect of the present invention also provides a computer readable recording medium storing a computer readable program for executing the method of guaranteeing the quality of service (QoS) of the data stream received by the mobile node.

According to an aspect of the present invention, there is provided a method of transmitting a data stream, the method including obtaining information regarding a link characteristic change of a mobile node, which occurs due to a handover of the mobile node between heterogeneous links; and transmitting a data stream to the mobile node based on the obtained information regarding the link characteristic change of the mobile node.

According to another aspect of the present invention, there is provided an apparatus transmitting a data stream, the apparatus including a handover function layer obtaining information regarding a link characteristic change of a mobile node, which occurs due to a handover of the mobile node between heterogeneous links; and an upper layer transmitting a data stream to the mobile node based on the obtained information regarding the link characteristic change of the mobile node.

According to another aspect of the present invention, there is provided a computer readable recording medium storing a computer readable program for executing the data stream transmitting method.

According to another aspect of the present invention, there is provided a method of receiving a data stream, the method including providing information regarding a link characteristic change of a mobile node, which occurs due to a handover of the mobile node between heterogeneous links; and receiving a data stream transmitted based on the obtained information regarding the link characteristic change of the mobile node.

According to another aspect of the present invention, there is provided an apparatus receiving a data stream, the apparatus including a handover function layer providing information regarding a link characteristic change of a mobile node, which occurs due to a handover of the mobile node between heterogeneous links; and an upper layer receiving a data stream transmitted based on the obtained information regarding the link characteristic change of the mobile node.

According to another aspect of the present invention, there is provided a computer readable recording medium storing a computer readable program for executing the data stream receiving method on a computer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjuction with the accompanying drawings of which:

FIG. 4 illustrates a format of an event according to an embodiment of the present invention;

FIG. 5 illustrates a format of a media independent handover (MIH) information request message according to an embodiment of the present invention;

FIG. 6 illustrates a format of a MIH information response message according to an embodiment of the present invention;

DETAILED DESCRIPTION OF THE EMBODIMENTS

Figures 1, 2:
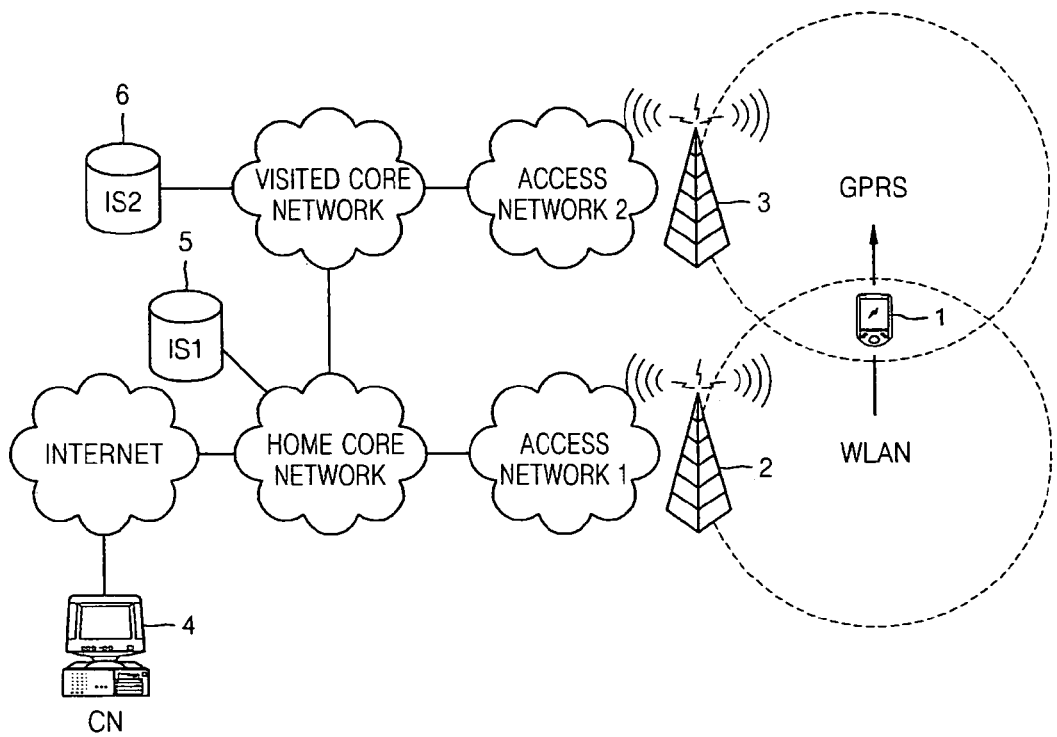
FIG. 1 is a conceptual diagram of a mobile communication environment according to an embodiment of the present invention.
FIG. 2 illustrates a format of an information element table according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a conceptual diagram of a mobile communication environment according to an embodiment of the present invention.

Referring to FIG. 1, the mobile communication environment includes a mobile node 1, a wireless local area network (WLAN) Point of Attachment (POA) 2, a General Packet Radio Services (GPRS) POA 3, a correspondent node 4, a first information server 5, and a second information server 6. It will be understood by those of ordinary skill in the art that the current embodiment can be formed with various topologies without being limited to the network topology illustrated in FIG. 1. In addition, though FIG. 1 illustrates only an IEEE 802.11-based WLAN link and a GPRS link as links connected to the mobile node 1, it will be understood by those of ordinary skill in the art that the current embodiment can be applied to an IEEE 802.15 or IEEE 802.16-based WLAN link or a $3^{rd}$ Generation Partnership Project (3GPP) or 3GPP2-based cellular link.

According to the prior art, even if the mobile node 1 moves from a WLAN link having an available bandwidth of 10 Mbps to a GPRS link having an available bandwidth of 100 Kbps, since the correspondent node 4 cannot recognize the communication environment change, the correspondent node 4 transmits a data stream to the mobile node 1 using the bandwidth of the WLAN link. Thus, a bit error ratio (BER) and a signal-to-noise ratio (SNR) of the data stream received by the mobile node 1 are increased. In an embodiment of the present invention, in order to solve this problem, the correspondent node 4 is allowed to obtain information regarding a link characteristic change of the mobile node 1, which occurs due to a handover of the mobile node 1 between heterogeneous links. Thus, in an embodiment of the present invention, an information element regarding a link characteristic change of the mobile node 1 is added to information elements defined in the IEEE 802.21 standard.

FIG. 2 illustrates a format of an information element table according to an embodiment of the present invention.

Referring to FIG. 2, the information element table includes an information element name field 201, a description field 202, a media types field 203, and a comments field 204. An entry is expressed as a combination of these four fields. The name of an information element is recorded in the information element name field 201, the description of the information element is recorded in the description field 202, the type of a medium which is a target of the information element is recorded in the media types field 203, and comments of the information element are recorded in the comments field 204. In particular, if 'QoS information' is recorded in the information element name field 201, values related to an information element regarding a link characteristic change of the mobile node 1 are recorded in the description field 202, the media types field 203, and the comments field 204, and all of these fields are part of the same entry as the 'QoS information'.

Examples of link characteristic changes of the mobile node 1 are a data rate change, a BER change, a SNR change, a data latency change, and a jitter quantity change of the mobile node 1 belonging to a certain link.

Figure 3:
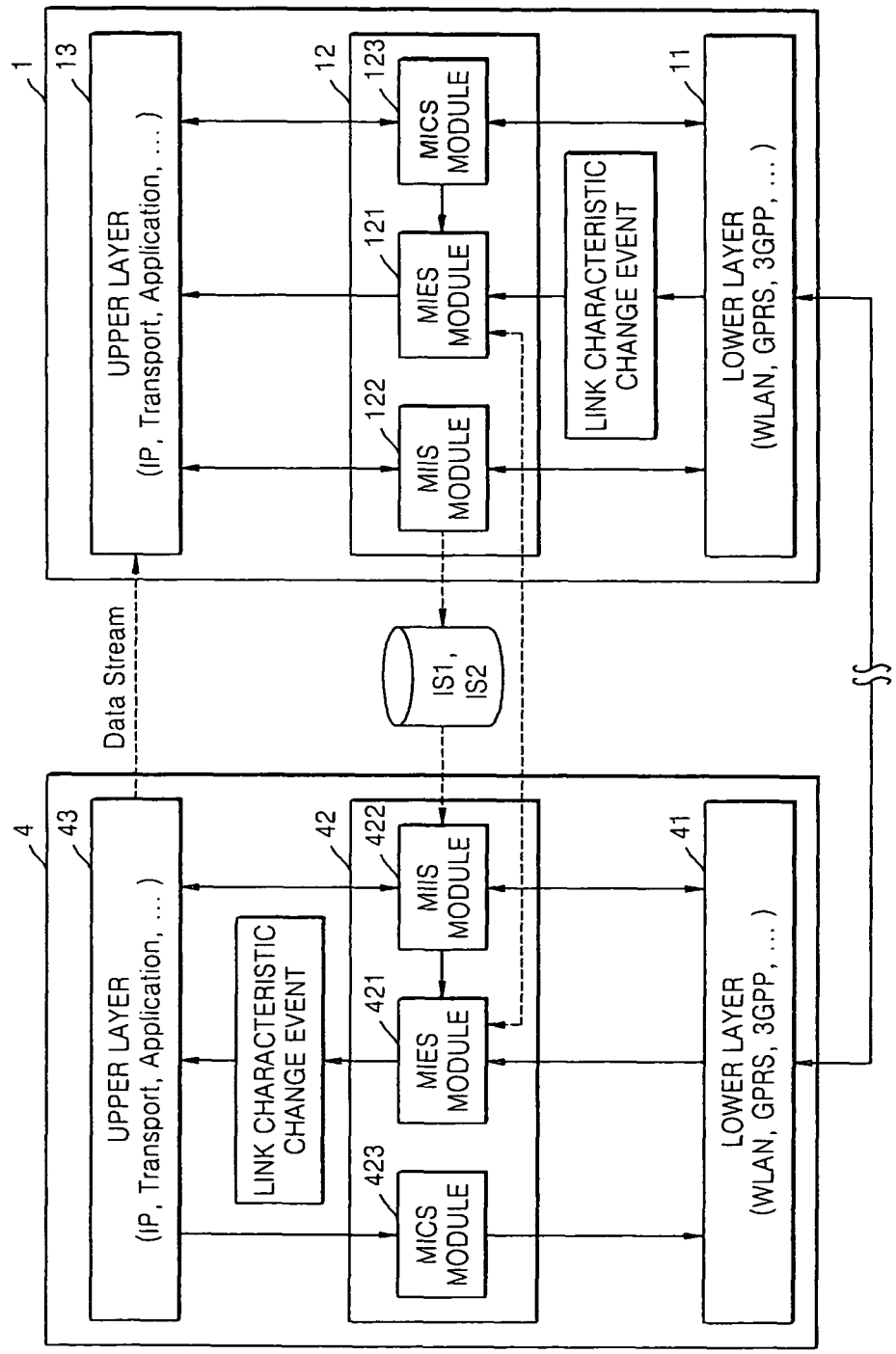
FIG. 3 is a block diagram of a correspondent node and a mobile node according to an embodiment of the present invention.

FIG. 3 is a block diagram of the correspondent node 4 and the mobile node 1, which are illustrated in FIG. 1, according to an embodiment of the present invention.

Referring to FIG. 3, the correspondent node 4 includes a lower layer 41, a media independent handover (MIH) function layer 42, and an upper layer 43. In particular, the correspondent node 4 is a type of server providing a data stream to the mobile node 1. The data stream provided from the correspondent node 4 to the mobile node 1 is, for example, an audio/video (AV) data stream. In order for the correspondent node 4 to provide a data stream to the mobile node 1, the data stream passes through the stack of layers of the correspondent node 4, such as upper layer 43, the MIH function layer 42, and the lower layer 41. Thereafter, the data stream arrives at the mobile node 1 via an access network, a core network, and the Internet, which are illustrated in FIG. 1. Then, the data stream passes through a stack of layers of the mobile node 1, such as a lower layer 11, an MIH function layer 12, and an upper layer 13, which are included in the mobile node 1. However, hereinafter, for convenience of description, the expression that the upper layer 43 of the correspondent node 4 provides a data stream to the upper layer 13 of the mobile node 1 may be used.

The lower layer 41 includes a second layer and a first layer, i.e., a link layer and a physical layer, among seven layers defined by an Open Systems Interconnection (OSI) reference model. The upper layer 43 includes third through seventh layers, such as an Internet Protocol (IP) layer, a mobile IP layer, a transport layer, an application layer, etc., among the seven layers defined by the OSI reference model. The MIH function layer 42 is not defined by the OSI reference model but defined by the IEEE 802.21 standard. That is, the MIH function layer 42 corresponds to a 2.5-layer existing between the lower layer 41 and the upper layer 43 and supports a handover performed by the lower layer 41 and the upper layer 43.

According to the IEEE 802.21 standard, the MIH function layer 42 supports a handover between heterogeneous links in a way which is independent of the media type of a link connected to the mobile node 1. That is, the MIH function layer 42 supports a handover between heterogeneous links in a way which is independent of the type of a link interface corresponding to the lower layer 41. The MIH function layer 42 includes a Media Independent Event Service (MIES) module 421, a Media Independent Information Service (MIIS) module 422, and a Media Independent Command Service (MICS) module 423.

The MIES module 421 detects that an event related to a handover between different links has been generated in the mobile node 1 and reports the generation of the event to the upper layer 43. In particular, according to an embodiment of the present invention, the MIES module 421 detects that an event corresponding to a link characteristic change of the mobile node 1, which occurs due to a handover of the mobile node 1 between heterogeneous links, has been generated in the mobile node 1 and reports the generation of the event to the upper layer 43. In more detail, the MIES module 421 requests the mobile node 1 to register the correspondent node 4, in order to receive an event generation message, and detects the generation of an event by receiving the event generation message from the mobile node 1 in which the correspondent node 4 is registered. The MIES module 421 can report the generation of an event to the upper layer 43 by establishing a new event, as illustrated in FIG. 4.

FIG. 4 illustrates a format of an event according to an embodiment of the present invention.

Referring to FIG. 4, an event according to an embodiment of the present invention includes an event identifier field 401, an event type field 402, an event name field 403, and a description field 404. An entry is expressed as a combination of these four fields. An identifier for identifying the event is recorded in the event identifier field 401, the type of the event is recorded in the event type field 402, the name of the event is recorded in the event name field 403, and the description of the event is recorded in the description field 404. In particular, if an identifier 'LCI' is recorded in the event identifier field 401, values indicating an event related to a link characteristic change of the mobile node 1, which occurs due to a handover of the mobile node 1 between heterogeneous links, are recorded in the event type field 402, the event name field 403, and the description field 404, which are part of the same entry as the identifier 'LCI'.

Referring back to FIG. 3, the MIIS module 422 obtains information regarding the handover of the mobile node 1 between heterogeneous links from the first information server 5 or the second information server 6, which collect the information regarding the handover of the mobile node 1 between heterogeneous links. Hereinafter, the first information server 5 or the second information server 6 will be simply referred to as the information server 5 or 6. In particular, according to an embodiment of the present invention, the MIIS module 422 obtains from the information server 5 or 6 information regarding a link characteristic change of the mobile node 1, which occurs due to the handover of the mobile node 1 between heterogeneous links. For example, if the mobile node 1 has moved from a WLAN link having an available bandwidth of 10 Mbps to a GPRS link having an available bandwidth of 100 Kbps, the MIIS module 422 obtains information indicating a decrease of the data rate as a result of the handover of the mobile node 1 from the WLAN link to the GPRS link.

The MIIS module 422 obtains information regarding a link characteristic change of the mobile node 1 by one of the following two methods. According to the first method, the MIIS module 422 obtains information regarding a characteristic of a link, which is being connected to the mobile node 1, from the information server 5 or 6 after handover of the mobile node 1 is completed. In this case, since the information obtained by the MIIS module 422 is information measured by the mobile node 1, reliability of the information is high. However, since the correspondent node 4 obtains the information only after the handover of the mobile node 1 is completed, the correspondent node 4 cannot cope with the handover of the mobile node 1 for a certain time after the handover of the mobile node 1 is completed.

In the first method, if the MIIS module 422 detects that an event corresponding to a link characteristic change of the mobile node 1, which occurs due to a handover of the mobile node 1 between heterogeneous links, has been generated, the MIIS module 422 requests the information server 5 or 6 for information regarding the link characteristic change of the mobile node 1, which occurs due to the handover of the mobile node 1 between heterogeneous links, and obtains information from the information server 5 or 6 in response to the request. That is, the MIIS module 422 requests the information server 5 or 6 or the mobile node 1 for information regarding the link characteristic change of the mobile node 1, which occurs due to the handover of the mobile node 1 between heterogeneous links, by transmitting a MIH information request message having a format illustrated in FIG. 5 to the information server 5 or 6 or the mobile node 1. In addition, the MIIS module 422 obtains information from the information server 5 or 6 in response to the request by receiving a MIH information response message having a format illustrated in FIG. 6 from the information server 5 or 6.

According to the second method, the MIIS module 422 obtains information regarding a characteristic of a link, which is predicted to be connected to the mobile node 1, from the information server 5 or 6 before handover of the mobile node 1 is performed. In this case, since the correspondent node 4 obtains the information before the handover of the mobile node 1 is performed, the correspondent node 4 can quickly cope with the handover of the mobile node 1. However, since the information obtained by the MIIS module 422 is not information measured by the mobile node 1, reliability of the information is low. There are various prior art methods that can be used to predict which link the mobile node 1 will be connected to, and thus, a description of the prediction method will not be provided here. In the second method, the MIIS module 422 obtains information regarding a characteristic of a link, which is predicted to be connected to the mobile node 1, from the information server 5 or 6 before handover of the mobile node 1 is performed, i.e., before the generation of an event is detected, regardless of a request of the mobile node 1.

FIG. 5 illustrates a format of a MIH information request message according to an embodiment of the present invention.

Referring to FIG. 5, the MIH information request message according to an embodiment of the present invention includes a name field 501, a type field 502, a length field 503, and a value field 504. An entry is expressed as a combination of these four fields. A name of MIH information is recorded in the name field 501, a type of the MIH information is recorded in the type field 502, a length of the MIH information is recorded in the length field 503, and a value of the MIH information is recorded in the value field 504.

In particular, if a name 'link characteristic information' is recorded in the name field 501, information regarding a link characteristic change of the mobile node 1, which occurs due to a handover of the mobile node 1 between heterogeneous links, is recorded in the type field 502, the length field 503, and the value field 504, which are part of the same entry as the name 'link characteristic information'. If a name 'link type' is recorded in the name field 501, information regarding the type of a link, which is being connected or is predicted to be connected to the mobile node 1, is recorded in the type field 502, the length field 503, and the value field 504, which are part of the same entry as the name 'link type'. In this case, the former corresponds to a MIH information request message according to the first method, and the latter corresponds to a MIH information request message according to the second method.

In order to indicate what kind of information is requested from the information server 5 or 6, the MIIS module 422 records values for specifying information regarding a link characteristic change of the mobile node 1, which occurs due to a handover of the mobile node 1 between heterogeneous links, in the name field 501, the type field 502, and the length field 503 among the fields of a MIH information request message, and records no value in the value field 504.

FIG. 6 illustrates a format of a MIH information response message according to an embodiment of the present invention.

Referring to FIG. 6, the MIH information response message according to an embodiment of the present invention includes a name field 601, a type field 602, a length field 603, and a value field 604. An entry is expressed as a combination of these four fields. In particular, the MIH information response message illustrated in FIG. 6 has the same format as the MIH information request message illustrated in FIG. 5. However, a value indicating a link characteristic change of the mobile node 1, e.g., a data rate of a GPRS link, is recorded in the value field 604.

The information server 5 or 6 detects the fact that the correspondent node 4 has requested information regarding a link characteristic change of the mobile node 1, which occurs due to a handover of the mobile node 1 between heterogeneous links, by referring to the name field 501 of a MIH information request message and records relevant information in the value field 604 in the same format as values recorded in the type field 502 and the length field 503.

Referring back to FIG. 3, the MICS module 423 controls a handover performed in the lower layer 41, i.e., the link layer, in response to a command input from the upper layer 43, e.g., a command input by a user.

The upper layer 43 transmits a data stream to the mobile node 1 based on information obtained by the MIIS module 422 of the MIH function layer 42. In more detail, if the upper layer 43 receives from the MIIS module 422 of the MIH function layer 42 a report that an event corresponding to a link characteristic change of the mobile node 1, which occurs due to a handover of the mobile node 1 between heterogeneous links, has been generated, the upper layer 43 transmits a data stream to the mobile node 1 based on information obtained by the MIIS module 422 of the MIH function layer 42.

In particular, the upper layer 43 can guarantee the QoS of the data stream by adjusting the QoS of the data stream according to the link characteristic change of the mobile node 1 and transmitting the data stream to the mobile node 1 based on the adjusted QoS. That is, the upper layer 43 transmits a data stream to the mobile node 1 based on a QoS corresponding to a characteristic of a certain link connected to the mobile node 1 before handover of the mobile node 1 is performed, and transmits a data stream to the mobile node 1 based on a QoS corresponding to a characteristic of another link connected to the mobile node 1 after the handover of the mobile node 1 is performed.

If information regarding a link characteristic change of the mobile node 1 includes information regarding a link data rate of the mobile node 1, the upper layer 43 adjusts the data rate of a data stream according to a change of the link data rate of the mobile node 1 and transmits the data stream to the mobile node 1 at the adjusted data rate. For example, if the mobile node 1 has moved from a WLAN link having an available bandwidth of 10 Mbps to a GPRS link having an available bandwidth of 100 Kbps, the MIIS module 422 obtains information indicating a decrease of the data rate as a result of a handover of the mobile node 1 from the WLAN link to the GPRS link, and the upper layer 43 decreases a data rate of a data stream according to the decrease of the data rate due to the handover of the mobile node 1 from the WLAN link to the GPRS link and transmits the data stream to the mobile node 1 at the decreased data rate.

The mobile node 1 includes the lower layer 11, the MIH function layer 12, and the upper layer 13. The lower layer 11 includes a second layer and a first layer, i.e., a link layer and a physical layer, among seven layers defined by the OSI reference model, like the lower layer 41 of the correspondent node 4. The upper layer 13 includes third through seventh layers, such as an Internet Protocol (IP) layer, a mobile IP layer, a transport layer, an application layer, etc., among the seven layers defined by the OSI reference model, like the upper layer 43 of the correspondent node 4. The MIH function layer 12 corresponds to a 2.5-layer existing between the lower layer 11 and the upper layer 13 and supports a handover performed by the lower layer 11 and the upper layer 13, like the MIH function layer 42 of the correspondent node 4.

The lower layer 11 includes the link layer, in which heterogeneous link interfaces for connection with heterogeneous links are installed, and performs a handover between heterogeneous links by connecting to one of the heterogeneous links using one of the heterogeneous link interfaces and then connecting to another heterogeneous link using another of the heterogeneous link interfaces. Thus, the MIH function layer 12 is located between the link layer in which heterogeneous link interfaces for connection with heterogeneous links are installed and the upper layer 13.

According to the IEEE 802.21 standard, the MIH function layer 12 supports a handover between heterogeneous links in a way which is independent of the media type of a link connected to the mobile node 1. Referring to FIG. 3 the MIH function layer 12 includes a MIES module 121, a MIIS module 122, and a MICS module 123.

The MIES module 121 detects that an event related to a handover between different links has been generated in the lower layer 11 and reports the generation of the event to the correspondent module 4. In particular, according to an embodiment of the present invention, the MIES module 121 detects that an event corresponding to a link characteristic change of the mobile node 1, which occurs due to a handover of the mobile node 1 between heterogeneous links, has been generated in the lower layer 11, and reports the generation of the event to the correspondent module 4. In more detail, if the MIES module 121 receives a registration request of the correspondent node 4 for receiving a report of generation of an event, the MIES module 121 registers the correspondent node 4. Thereafter, if the MIES module 121 detects generation of an event related to a handover between different links, the MIES module 121 reports the generation of the event to the correspondent node 4.

The MIIS module 122 provides information regarding a handover of the mobile node 1 between heterogeneous links to the information server 5 or 6, which collects the information regarding the handover of the mobile node 1 between heterogeneous links. In particular, according to an embodiment of the present invention, the MIIS module 122 provides to the information server 5 or 6 information regarding a link characteristic change of the mobile node 1, which occurs due to the handover of the mobile node 1 between heterogeneous links.

The MIIS module 122 provides information regarding a link characteristic change of the mobile node 1 by one of the following two methods. According to the first method, the MIIS module 122 provides information regarding a characteristic of a link, which is being connected to the mobile node 1, to the information server 5 or 6 after handover of the mobile node 1 is completed. In this case, if the MIIS module 122 receives from the information server 5 or 6 a request for information regarding a link characteristic change of the mobile node 1, which occurs due to a handover of the mobile node 1 between heterogeneous links, the MIIS module 122 provides the information to the information server 5 or 6 in response to the request. When the request is received from the correspondent node 4, the information server 5 or 6 transmits the request to the mobile node 1. According to the second method, the MIIS module 122 provides information regarding a characteristic of a link, which is predicted to be connected to the mobile node 1, to the information server 5 or 6 before handover of the mobile node 1 is performed. In this case, the MIIS module 122 provides information regarding a characteristic of a link, which is predicted to be connected to the mobile node 1, to the information server 5 or 6 before handover of the mobile node 1 is performed, i.e., before the generation of an event is detected, regardless of a request of the information server 5 or 6.

The MICS module 123 controls a handover performed in the lower layer 11, i.e., the link layer, in response to a command input from the upper layer 13, e.g., a command input by a user.

The upper layer 13 receives a data stream transmitted based on information provided by the MIIS module 122 of the MIH function layer 12. In particular, the upper layer 13 receives a data stream transmitted based on a QoS corresponding to a link characteristic change of the mobile node 1. That is, the upper layer 13 receives a data stream transmitted based on a QoS corresponding to a characteristic of a certain link connected to the mobile node 1 before handover of the mobile node 1 is performed, and receives a data stream transmitted based on a QoS corresponding to a characteristic of another link connected to the mobile node 1 after the handover of the mobile node 1 is performed.

If information regarding a link characteristic change of the mobile node 1 includes information regarding a link data rate of the mobile node 1, the upper layer 13 receives a data stream at a data rate adjusted according to a change of the link data rate of the mobile node 1. For example, if the mobile node 1 has moved from a WLAN link having an available bandwidth of 10 Mbps to a GPRS link having an available bandwidth of 100 Kbps, the MIIS module 122 provides information indicating a decrease of the data rate as a result of handover of the mobile node 1 from the WLAN link to the GPRS link, and the upper layer 13 receives a data stream from the mobile node 1 at a data rate which is decreased according to the decrease of the data rate due to the handover of the mobile node 1 from the WLAN link to the GPRS link.

Figure 7:
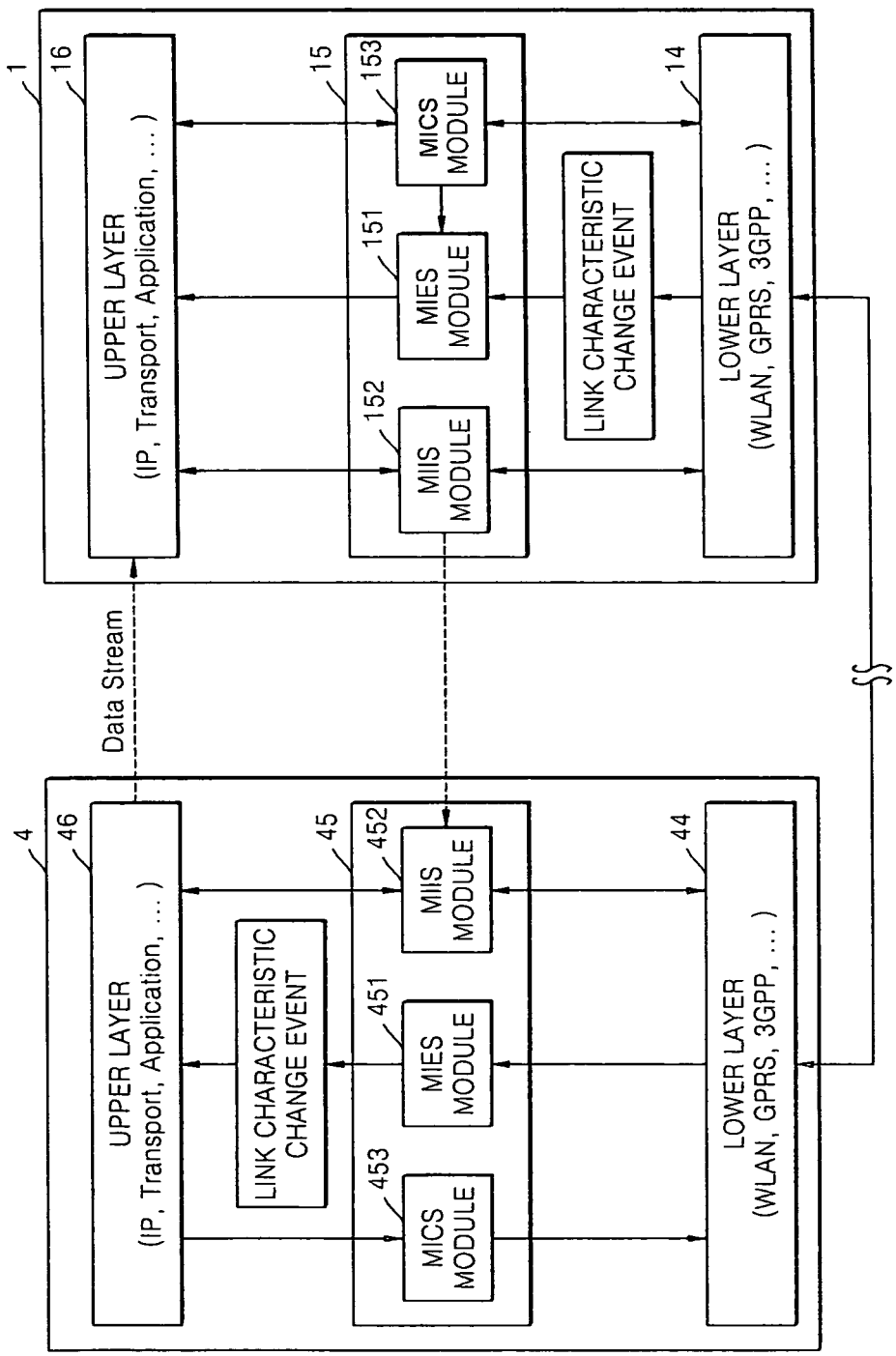
FIG. 7 is a block diagram of a correspondent node and a mobile node according to another embodiment of the present invention.

FIG. 7 is a block diagram of a correspondent node and a mobile node according to another embodiment of the present invention.

Like the correspondent node 4 illustrated in FIG. 3, the correspondent node 4 illustrated in FIG. 7 includes a lower layer 44, a MIH function layer 45, and an upper layer 46. In addition, like the MIH function layer 42 illustrated in FIG. 3, the MIH function layer 45 includes a MIES module 451, an MIIS module 452, and a MICS module 453.

In addition, like the mobile node 1 illustrated in FIG. 3, the mobile node 1 illustrated in FIG. 7 includes a lower layer 14, an MIH function layer 15, and an upper layer 16. In addition, like the MIH function layer 12 illustrated in FIG. 3, the MIH function layer 15 includes a MIES module 151, an MIIS module 152, and an MICS module 153.

The correspondent node 4 and the mobile node 1 illustrated in FIG. 7 differ from the correspondent node 4 and the mobile node 1 illustrated in FIG. 3 in that the MIH function layer 15 of the mobile node 1 provides information to the MIH function layer 45 of the correspondent node 4 without passing through the information server 5 or 6. In more detail, the MIIS module 452 of the correspondent node 4 illustrated in FIG. 7 directly requests the mobile node 1 illustrated in FIG. 7 for information regarding a link characteristic change of the mobile node 1, which occurs due to a handover of the mobile node 1 between heterogeneous links, and obtains the information from a response to the request. In this case, the mobile node 1 detects that the correspondent node 4 has requested the information regarding a link characteristic change of the mobile node 1, which occurs due to the handover of the mobile node 1 between heterogeneous links, by referring to the name field 501 included in a MIH information request message and records the information in the value field of a MIH information response message in the same format as values recorded in the type field 502 and the length field 503 included in the MIH information request message.

Figure 8:
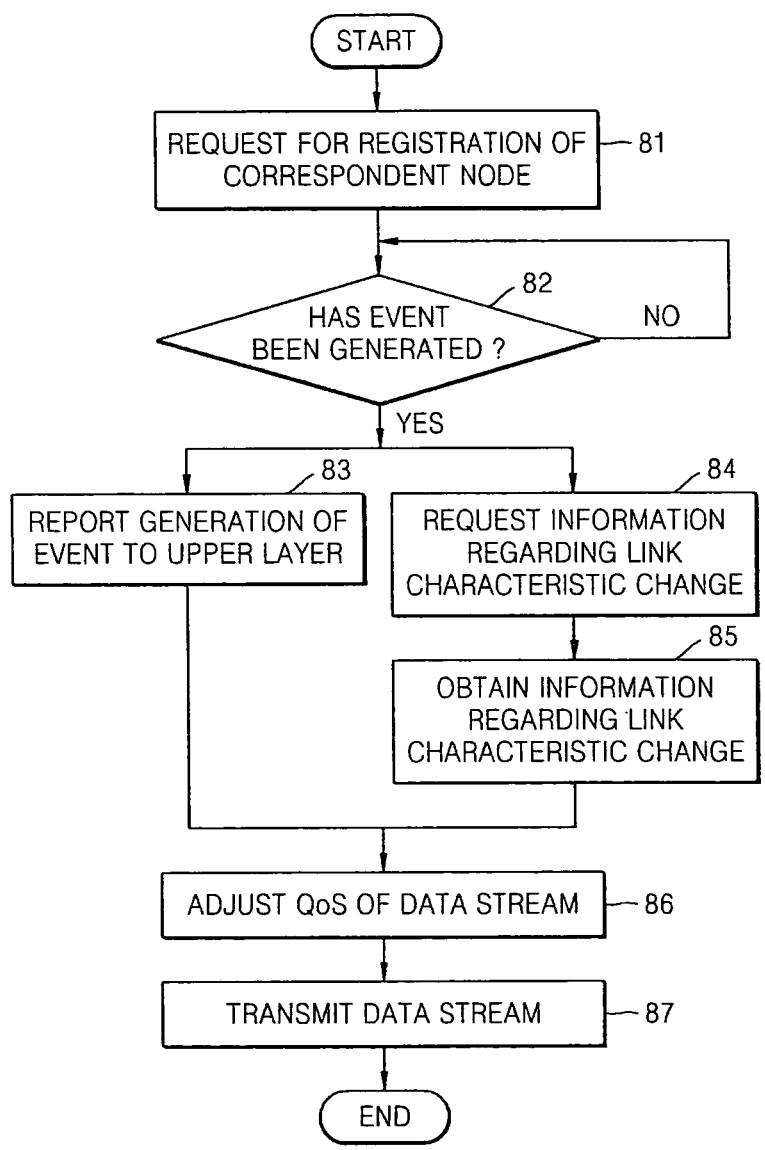
FIG. 8 is a flowchart illustrating a data transmitting method according to an embodiment of the present invention.

FIG. 8 is a flowchart illustrating a data transmitting method according to an embodiment of the present invention.

Referring to FIG. 8, the data transmitting method includes operations that are sequentially processed by the correspondent node 4 illustrated in FIG. 3 or 7. Thus, although a description of some of the operations of the data transmitting method may be omitted, the above description related to the correspondent node 4 illustrated in FIG. 3 or 7 can be applied to the data transmitting method of FIG. 8.

The correspondent node 4 requests the mobile node 1 for registration of the correspondent node 4 in operation 81 in order to receive a report of generation of an event corresponding to a link characteristic change of the mobile node 1, which occurs due to a handover of the mobile node 1 between heterogeneous links.

If the correspondent node 4 detects in operation 82 that an event corresponding to a link characteristic change of the mobile node 1, which occurs due to a handover of the mobile node 1 between heterogeneous links, has been generated, this process proceeds to operation 83.

In operation 83, the MIES module (421) of the correspondent node 4 reports to the upper layer 43 that an event corresponding to a link characteristic change of the mobile node 1, which occurs due to a handover of the mobile node 1 between heterogeneous links, has been generated.

In operation 84, the correspondent node 4 requests the information server 5 or 6 or the mobile node 1 for information regarding the link characteristic change of the mobile node 1, which occurs due to the handover of the mobile node 1 between heterogeneous links.

In operation 85, the correspondent node 4 obtains the information regarding the link characteristic change of the mobile node 1, which occurs due to the handover of the mobile node 1 between heterogeneous links, from a response to the request performed in operation 84.

However, the information acquisition method used in operation 85 follows the first method described above. If the information acquisition method used in operation 85 follows the second method described above, the correspondent node 4 obtains information regarding a characteristic of a link, which is predicted to be connected to the mobile node 1, before the handover of the mobile node 1 is performed, i.e., before the event is generated in operation 82, regardless of whether a request is performed in operation 84.

In operation 86, the correspondent node 4 adjusts the QoS of a data stream based on the information obtained in operation 85, i.e., according to the link characteristic change of the mobile node 1.

In operation 87, the correspondent node 4 transmits the data stream to the mobile node 1 based on the QoS adjusted in operation 86.

Figure 9:
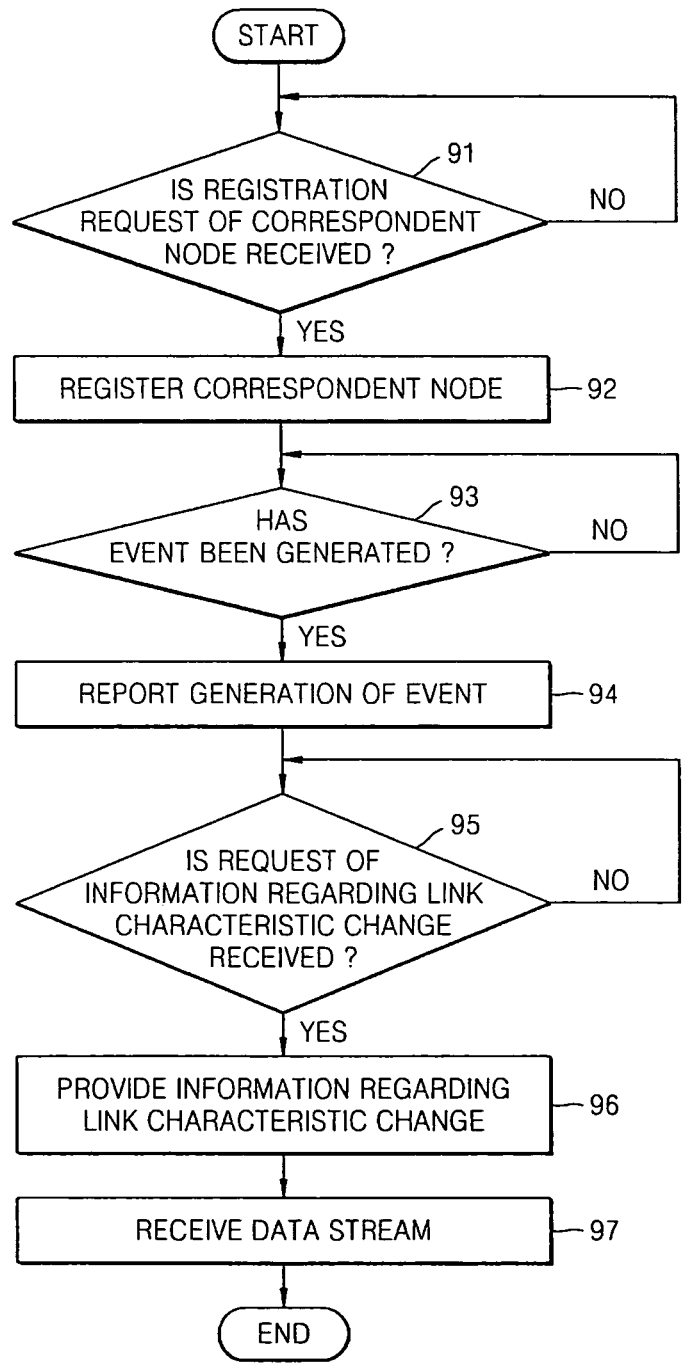
FIG. 9 is a flowchart illustrating a data receiving method according to an embodiment of the present invention.

FIG. 9 is a flowchart illustrating a data receiving method according to an embodiment of the present invention.

Referring to FIG. 9, the data receiving method includes operations sequentially processed by the mobile node 1 illustrated in FIG. 3 or 7. Thus, although a description of some of the operations of the data transmitting method may be omitted, the above description related to the mobile node 1 illustrated in FIG. 3 or 7 can be applied to the data receiving method of FIG. 9.

If the mobile node 1 receives in operation 91 a registration request from the correspondent node 4 which wants to receive a report of generation of an event corresponding to a link characteristic change of the mobile node 1, which occurs due to a handover of the mobile node 1 between heterogeneous links, the process proceeds to operation 92.

The mobile node 1 registers the correspondent node 4 in operation 92.

If the mobile node 1 detects in operation 93 that an event corresponding to a link characteristic change of the mobile node 1, which occurs due to a handover of the mobile node 1 between heterogeneous links, has been generated in the lower layer 11, the process proceeds to operation 94.

The mobile node 1 reports to the correspondent node 4 in operation 94 that the event corresponding to a link characteristic change of the mobile node 1, which occurs due to a handover of the mobile node 1 between heterogeneous links, has been generated.

In operation 95, if the mobile node 1 receives from the information server 5 or 6 or the correspondent node 4 a request for information regarding a link characteristic change of the mobile node 1, which occurs due to a handover of the mobile node 1 between heterogeneous links, the process proceeds to operation 96.

In operation 96, the mobile node 1 provides to the information server 5 or 6 or the correspondent node 4 the information regarding the link characteristic change of the mobile node 1, which occurs due to the handover of the mobile node 1 between heterogeneous links.

However, the information providing method used in operation 96 follows the first method described above. If the information providing method used in operation 96 follows the second method described above, the mobile node 1 provides information regarding a characteristic of a link, which is predicted to be connected to the mobile node 1, before the handover of the mobile node 1 is performed, i.e., before the event is generated in operation 93, regardless of whether a request is received in operation 95.

In operation 97, the mobile node 1 receives a data stream transmitted based on the information provided in operation 96. That is, in operation 97, the mobile node 1 receives a data stream transmitted based on a QoS corresponding to the link characteristic change of the mobile node 1.

An aspect of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As described above, according to an aspect of the present invention, by transmitting a data stream to a mobile node based on information regarding a link characteristic change of the mobile node, which occurs due to a handover of the mobile node between heterogeneous links, the QoS of the data stream can be guaranteed. That is, by guaranteeing the QoS of a data stream even when the mobile node moves from a certain link to another heterogeneous link, the BER and SNR of a data stream received by the mobile node do not increase.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of transmitting a data stream, the method comprising:
   at a correspondent node, transmitting a media independent handover (MIH) information request message having a predetermined format to at least one server or directly to a mobile node;
   at the correspondent node, detecting an event corresponding to a link characteristic change in the mobile node and reporting generation of the event;
   at the correspondent node, obtaining information regarding the link characteristic change of the mobile node by receiving a MIH information response message which uses the predetermined format, the link characteristic change indicating a change in a data rate of the data stream related to a handover of the mobile node between heterogeneous links in a link layer; and
   at the correspondent node, transmitting by an upper layer, the data stream to the mobile node based on the obtained information regarding the link characteristic change,
   wherein the correspondent node is a node communicating with the mobile node via a wireless network,
   wherein the event corresponding to the link characteristic change in the mobile node includes an event identifier field, an event type field, and event name field, and a description field.

2. The method of claim 1, wherein the transmitting of the data comprises adjusting a Quality of Service (QoS) of the data stream according to the link characteristic change of the mobile node and transmitting the data stream based on the adjusted QoS.

3. The method of claim 2, wherein the transmitting of the data comprises transmitting the data stream based on the QoS corresponding to a characteristic of a first link connected to the mobile node before the handover and transmitting the data stream based on the QoS corresponding to a characteristic of a second link connected to the mobile node after the handover.

4. The method of claim 1, wherein the information regarding the link characteristic change comprises information regarding the change in the data rate of the mobile node, and the obtaining of the information comprises adjusting a data rate of the data stream according to the change of the data rate of the mobile node and transmitting the data stream based on the adjusted data rate.

5. The method of claim 1, wherein the obtaining of the information comprises obtaining information regarding a characteristic of a link, which is being connected to the mobile node, after the handover.

6. The method of claim 1, wherein the obtaining of the information comprises obtaining information regarding a characteristic of a link, which is being connected to the mobile node, before the handover.

7. The method of claim 1, further comprising:
   at the correspondent node, requesting the mobile node to register the correspondent node to receive an event generation message related to the handover of the mobile node between heterogeneous links in a link layer.

8. An apparatus transmitting a data stream, the apparatus comprising:
   a handover function layer to transmit a media independent handover (MIH) information request message having a predetermined format to at least one server or directly to a mobile node and to obtain information regarding a link characteristic change of the mobile node by receiving a MIH information response message using the predetermined format, wherein the handover function layer comprises:
      an event service module to detect an event corresponding to the link characteristic change in the mobile node and to report generation of the event; and
      an information service module to obtain the information regarding the link characteristic change,
   wherein the link characteristic change occurs in relation to a handover of the mobile node between heterogeneous links in a link layer, the link characteristic change indicating a change in a data rate of the data stream; and
   an upper layer to transmit the data stream to the mobile node based on the obtained information, wherein the event corresponding to the link characteristic change in the mobile node includes an event identifier field, an event type field, and event name field, and a description field.

9. The apparatus of claim 8, wherein the handover function layer is located between a link layer, in which heterogeneous link interfaces for connection with the heterogeneous links are installed, and the upper layer.

10. The apparatus of claim 9, wherein the handover function layer is a 2.5-layer and supports the handover between the heterogeneous links independent of a media type of a link connected to the mobile node.

11. The apparatus of claim 8, wherein the upper layer includes an Internet Protocol (IP) layer, a mobile layer, a transport layer and an application layer.

12. The apparatus of claim 8, wherein the handover function layer further comprises a media independent command service module controlling the handover performed in a link layer, in response to a command input from the upper layer.

13. The apparatus of claim 8, wherein the information service module obtains the information regarding the link characteristic change of the mobile node from a server.

14. A non-transitory computer readable recording medium storing a computer readable program for executing a data stream transmitting method on a computer, the method comprising:
at a correspondent node, transmitting a media independent handover (MIH) information request message using a predetermined format to at least one server or directly to a mobile node;
at the correspondent node, detecting an event corresponding to a link characteristic change in the mobile node and reporting generation of the event;
at the correspondent node, obtaining information regarding the link characteristic change of the mobile node by receiving a MIH information response message which uses the predetermined format, the link characteristic change indicating a change in a data rate of the data stream related to a handover of the mobile node between heterogeneous links in a link layer; and
at the correspondent node, transmitting by an upper layer, a data stream to the mobile node based on the obtained information regarding the link characteristic change,
wherein the correspondent node is a node communicating with the mobile node via a wireless network,
wherein the event corresponding to the link characteristic change in the mobile node includes an event identifier field, an event type field, and event name field, and a description field.

15. A method of receiving a data stream, the method comprising:
receiving a media independent handover (MIH) information request message using a predetermined format from at least one server or directly from a correspondent node;
detecting an event corresponding to a link characteristic change in the mobile node and reporting generation of the event;
providing information, by sending a MIH information response message using the predetermined format to the at least one server or directly to the correspondent node, regarding the link characteristic change of a mobile node, the link characteristic change indicating a change in a data rate of the data stream related to a handover of the mobile node between heterogeneous links in a link layer; and
receiving the data stream transmitted based on the provided information, from an upper layer of the correspondent node,
wherein the correspondent node is a node communicating with the mobile node via a wireless network,
wherein the event corresponding to the link characteristic change in the mobile node includes an event identifier field, an event type field, and event name field, and a description field.

16. The method of claim 15, wherein the receiving of the data stream comprises receiving the data stream based on a Quality of Service (QoS) corresponding to the link characteristic change of the mobile node.

17. The method of claim 16, wherein the receiving of the data stream comprises receiving the data stream based on the QoS corresponding to a characteristic of a first link connected to the mobile node before the handover and receiving the data stream based on the QoS corresponding to a characteristic of a second link connected to the mobile node after the handover.

18. The method of claim 15, wherein the information regarding the link characteristic change comprises information regarding the change of the data rate of the mobile node, and
the receiving of the data stream comprises receiving the data stream transmitted at a data rate adjusted according to the change of the data rate of the mobile node.

19. The method of claim 15, wherein the providing of the information regarding the link characteristics comprises providing information regarding a characteristic of a link, which is being connected to the mobile node, after the handover.

20. The method of claim 15, wherein the providing of the information regarding the link characteristics comprises providing information regarding a characteristic of a link, which is being connected to the mobile node, before the handover.

21. The method of claim 15, further comprising:
registering the correspondent node.

22. An apparatus receiving a data stream, the apparatus comprising:
a handover function layer to receive a media independent handover (MIH) information request message using a predetermined format from at least one server or directly from a correspondent node, and to provide information by sending a MIH information response message using the predetermined format to the at least one server or directly to the correspondent node, regarding a link characteristic change of a mobile node,
wherein the handover function layer comprises:
an event service module to detect an event corresponding to the link characteristic change in a lower layer and to report the generation of the event; and
an information service module to provide the information,
wherein the link characteristic change indicates a change in a data rate of the data stream related to a handover of the mobile node between heterogeneous links in a link layer; and
an upper layer to receive the data stream transmitted based on the provided information from an upper layer of the correspondent node, which has received the report regarding the generation of the event,
wherein the event corresponding to the link characteristic change in the mobile node includes an event identifier field, an event type field, and event name field, and a description field.

23. The apparatus of claim 22, wherein the handover function layer is located between a link layer in which heterogeneous link interfaces for connection with the heterogeneous links are installed and the upper layer.

24. A non-transitory computer readable recording medium storing a computer readable program executing a data stream receiving method on a computer, the method comprising:
- receiving a media independent handover (MIH) information request message using a predetermined format from at least one server or directly from a correspondent node;
- detecting an event corresponding to a link characteristic change in the mobile node and reporting generation of the event;
- providing information, by sending a MIH information response message using the predetermined format to the at least one server or directly to the correspondent node, regarding the link characteristic change of a mobile node, the link characteristic change indicating a change in a data rate of the data stream related to a handover of the mobile node between heterogeneous links in a link layer; and
- receiving the data stream transmitted based on the provided information, from an upper layer of the correspondent node,
- wherein the correspondent node is a node communicating with the mobile node via a wireless network,
- wherein the event corresponding to the link characteristic change in the mobile node includes an event identifier field, an event type field, and event name field, and a description field.

25. An apparatus transmitting a data stream, the apparatus comprising:
- a lower layer to perform a handover of a mobile node between heterogeneous links in a link layer;
- a handover function layer to support the handover of a mobile node between the heterogeneous links and to obtain information regarding a link characteristic change of the mobile node by transmitting a media independent handover (MIH) information request message using a predetermined format to at least one server or directly to the mobile node and by receiving a MIH information response message using the predetermined format, the link characteristic change indicating a change in a data rate of the data stream due to the handover between the heterogeneous links,
- wherein the handover function layer comprises:
  - an event service module to detect an event corresponding to the link characteristic change in the mobile node and to report generation of the event; and
  - an information service module to obtain the information regarding the link characteristic change; and
- an upper layer to transmit the data stream to the mobile node based on the obtained information,
- wherein the handover function layer includes a 2.5-layer existing between the lower layer and the upper layer,
- wherein the event corresponding to the link characteristic change in the mobile node includes an event identifier field, an event type field, and event name field, and a description field.

26. The apparatus of claim 25, wherein the lower layer includes a link layer and a physical layer.

27. The apparatus of claim 25, wherein the upper layer includes an Internet Protocol (IP) layer, a mobile layer, a transport layer, and an application layer.

28. The apparatus of claim 25, wherein the 2.5-layer corresponds to an Institute of Electrical and Electronics Engineers (IEEE) 802.21 standard media independent handover function layer.

* * * * *